(12) United States Patent
Woytowitz et al.

(10) Patent No.: US 8,744,773 B2
(45) Date of Patent: Jun. 3, 2014

(54) RAIN SENSOR WITH VARIABLE SHUT OFF

(75) Inventors: Peter J. Woytowitz, San Diego, CA (US); La Monte D. Porter, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 836 days.

(21) Appl. No.: 12/783,038

(22) Filed: May 19, 2010

(65) Prior Publication Data

US 2011/0288775 A1 Nov. 24, 2011

(51) Int. Cl.
*G01W 1/14* (2006.01)
*G01W 1/02* (2006.01)
*G01N 27/74* (2006.01)
*G01N 25/26* (2006.01)

(52) U.S. Cl.
USPC ............. 702/3; 324/204; 73/73; 73/170.21

(58) Field of Classification Search
USPC ........... 702/3, 2, 57, 113, 115, 116, 155, 158; 73/73, 74, 77, 170.16, 170.17, 170.21; 324/200, 204, 205, 206, 207.2, 207.13, 324/207.11, 219
See application file for complete search history.

(56) References Cited

U.S. PATENT DOCUMENTS

| | | | |
|---|---|---|---|
| 3,808,385 A | 4/1974 | Klinefelter | 200/61.04 |
| 4,107,604 A | 8/1978 | Bernier | 324/208 |
| 4,655,076 A | 4/1987 | Weihe et al. | 73/73 |
| 6,570,109 B2 | 5/2003 | Klinefelter et al. | 200/61.04 |
| 6,977,351 B1 | 12/2005 | Woytowitz | 200/61.04 |
| 7,912,588 B2 * | 3/2011 | Runge et al. | 700/284 |
| 7,949,433 B2 * | 5/2011 | Hern et al. | 700/284 |
| 8,225,810 B2 * | 7/2012 | Blanchard | 137/78.3 |
| 2010/0030476 A1 | 2/2010 | Woytowitz | 702/3 |

* cited by examiner

*Primary Examiner* — Sujoy Kundu
*Assistant Examiner* — Ricky Ngon
(74) *Attorney, Agent, or Firm* — Knobbe, Martens, Olson & Bear, LLP (57) ABSTRACT

An intelligent rain sensor incorporates at least one hygroscopic member and a sensor that generates signals representative of its amount of expansion due to absorption of moisture. A microcontroller executes a pre-programmed algorithm that determines at least the rate of expansion and uses that information to distinguish between actual rainfall events on the one hand, and high humidity, dew or a light sprinkle on the other hand, and sends a shut off command to an irrigation controller.

20 Claims, 7 Drawing Sheets

RAIN SENSOR WITH VARIABLE SHUT OFF

FIELD OF THE INVENTION

The present invention relates to irrigation of turf and/or landscaping, and more particularly, to sensors that detect rainfall and send signals to irrigation controllers causing them to suspend watering during periods of rainfall.

BACKGROUND OF THE INVENTION

Electronic irrigation controllers typically include a microprocessor or micro-controller that executes a stored watering program to turn a plurality of solenoid actuated valves ON and OFF. The valves deliver water to sprinklers that supply water to turf and/or other landscaping. Electro-mechanical rain sensors are often connected to irrigation controllers to suspend watering during periods of rainfall.

In a first type of conventional rain sensor, a bucket collects a certain amount of rain water, and then automatically tips so that the bucket is emptied. The process of filling and emptying the bucket continues as long as it is raining. The bucket is typically calibrated to empty after a predetermined amount of rain, for instance, one-tenth of an inch. A set of switch contacts close every time the bucket tips, generating one pulse for every one-tenth of an inch of rainfall. By way of example, one and one-half inches of rain would be indicated by fifteen pulses supplied by the rain bucket switch.

In a second type of conventional rain sensor, rain drops are directed to a common location where they are individually counted. This is often done by directing water droplets over closely spaced apart electrodes and detecting a conductive path through the individual water droplets. In this type of rain sensor one droplet is represented by one pulse. The size of the receptacle that catches the rain drops results in a certain number of droplets equating to a predetermined amount of rainfall.

In a third type of sensor a plurality of discs made of a hygroscopic material are mounted in a housing that collects rainfall and deposits it on the hygroscopic material through slots or other apertures formed in the housing. The discs expand as they absorb moisture, causing a two-state electro-mechanical switch to change states once the discs have generated a predetermined amount of movement via physical expansion of the same. The third type of rain sensor does not directly measure a given amount of rain however it is highly reliable and its simplicity and lower cost has resulted in its successful commercialization over many years. See U.S. Pat. No. 3,808,385 of Klinefelter granted Apr. 30, 1974.

SUMMARY OF THE INVENTION

In accordance with the present invention a rain sensor includes at least one hygroscopic member and an electronic sensor that detects an amount of expansion of the hygroscopic member upon absorbing moisture. The rain sensor further includes a processor and a memory connected to the processor. The memory is pre-programmed with an algorithm that enables the processor to determine the presence of rainfall and generate a shut off command, the determination being based at least in part on the signals generated by the electronic sensor indicating that the hygroscopic member has expanded at a predetermined rate.

According to one aspect of the present invention, the processor of an intelligent rain sensor utilizes an algorithm to discriminate between measurable rainfall on the one hand and dew, high humidity or a light sprinkle on the other hand. The processor does this based on the output signal of an electronic sensor operatively associated with at least one hygroscopic member. The electronic sensor generates an output signal representative of a degree of expansion of the hygroscopic member due to the absorption and evaporation of water. The processor generates a shut off command in response to a determination that measurable rainfall has occurred.

According to another aspect of the present invention, the processor generates the shut off command based on the output signal only upon a determination of measurable rainfall after intermittently sampling the output signal.

According to another aspect of the present invention the processor generates a shut off command based on the output signal upon detecting the occurrence of varying degrees of expansion of the hygroscopic member to thereby ensure that the shut off command is only generated when measurable rainfall has occurred.

According to another aspect of the present invention the processor generates a shut off command based on the output signal upon intermittently sampling the degree of expansion of the hygroscopic member and determining a variable dry-to-wet threshold.

According to yet another aspect of the present invention the processor generates a shut off command based upon the output signal indicating both a predetermined degree and a predetermined rate of expansion of the hygroscopic member.

According to another aspect of the present invention the processor generates a shut off command based upon the output signal by measuring a rate of expansion of the hygroscopic member and adjusting when the shut off command is generated based upon the measured rate of change.

BRIEF DESCRIPTION OF THE DRAWINGS

In the drawing figures, like reference numerals refer to like parts.

DETAILED DESCRIPTION

Conventional rain sensors are useful in saving water by curtailing the watering of turf and landscaping during rainfall, but they have numerous shortcomings. The first and second types of rain sensors discussed above tend to be more complex and costly and have a higher failure rate than the third type of rain sensor that employs discs made of a hygroscopic material. The first and second types of rains sensors can be relatively expensive and or unreliable due to electro-mechanical issues that arise during their lifetime. For example, the bucket can collect debris such as leaves and the electrodes can corrode. Therefore, hygroscopic rain sensors have been preferred in the irrigation industry. However, one of the problems that occurs with the moisture absorbing type rain sensors using hygroscopic discs is that they can be activated by heavy fog, dew, or very light sprinkles that cause the hygroscopic material to absorb sufficient moisture to cause it to expand sufficiently to actuate the associated switch to a different state. This false signal may suspend irrigation when in fact, measurable rainfall has not occurred and the watering program of the irrigation controller connected to the rain sensor should not be suspended.

The moisture absorbing rain sensor of the present invention is able to measure the actual distance of travel of a mechanical linkage associated with one or more hygroscopic members utilizing an electronic sensing device such as a Hall effect sensor. Programming executed by a micro-controller enables intelligent decisions based on the both the degree or amount of swelling or expansion of the hygroscopic material and the rate of expansion of the hygroscopic material. It is usually desirable for the irrigation to be interrupted as soon as possible upon commencement of actual rainfall. To accomplish this, the intelligent rain sensor of the present invention can generate a shut off command telling the irrigation controller to suspend irrigation once the hygroscopic material has swelled a predetermined minimum amount, as long as the time to expand that amount is achieved in a relatively short period of time. In the event of fog or heavy moisture accumulation in the rain sensor, the same amount of swelling of the hygroscopic material may take place at a much slower rate. By monitoring the rate of change of the swelling, the rain sensor of the present invention can determine that the detected rate of expansion is so slow that it is not being caused by rainfall.

The intelligent rain sensor of the present invention can continue to monitor the rate of change and continue to modify the trip point where it can determine with a high degree of certainty that a rain event has occurred. Ultimately, there is a point where the intelligent rain sensor of the present invention senses so much moisture that it sends a command to the irrigation controller which causes it to suspend watering because it is assumed that the heavy moisture that was swelling the absorptive moisture slowly has turned to rain, or provided enough moisture to the landscape to justify a rain shut-off command. This intelligent decision process creates a rain shut off device that reacts quickly in a rain event and avoids false shut off messages due to fog, heavy moisture accumulation or a very light sprinkle of rain.

Figure 1:
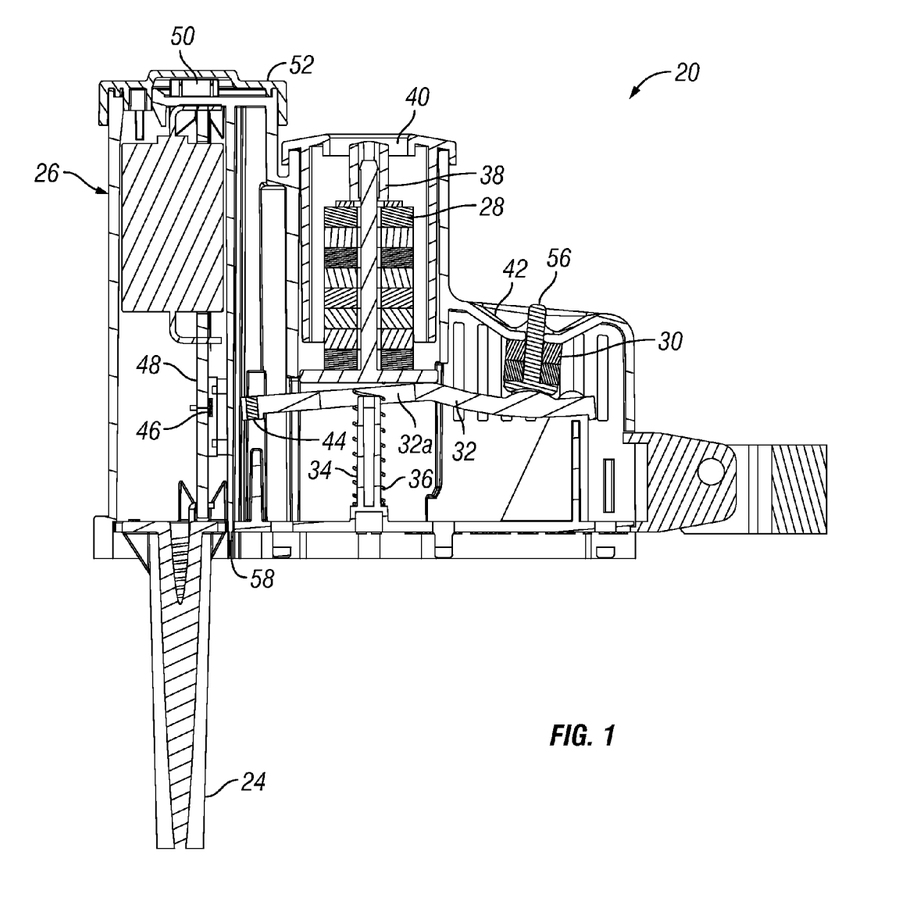
FIG. 1 is an enlarged vertical cross-section of a standalone rain and freeze sensor that incorporates an embodiment of the intelligent rains sensor of the present invention.

Referring to FIG. 1, a compact stand alone rain and freeze sensor 20 incorporates an embodiment of the intelligent rain sensor of the present invention. The rain sensor and freeze sensor 20 measures ambient air temperature, and detects a rain event. The rain and freeze sensor 20 is a one-piece unit that readily attaches to an exterior side of a building structure, a fence, or a rain gutter. The rain and freeze sensor 20 can be hard wired to an irrigation controller (not illustrated) via cable (not illustrated), or the communications between the rain and freeze sensor 20 and the irrigation controller may take place via wireless communications link including a transmitter 22 (FIG. 2) and antenna 24. The basic construction of the rain and freeze sensor 20 is somewhat similar to, but with less capability, than that disclosed in U.S. patent application Ser. No. 12/181,894 filed by Peter J. Woytowitz et al. on Jul. 29, 2008 and entitled "Irrigation System with ET Based Seasonal Watering Adjustment," the entire disclosure of which is hereby incorporated by reference Said application was published Feb. 4, 2010 under Publication No. US 2010/0030476 A1. Said application has been assigned to Hunter Industries, Inc. FIG. 12A of that application discloses a standalone weather station with a Hall effect sensor that generates a signal representative of the position of a permanent magnet moved by stacks of hygroscopic discs. See also U.S. Pat. No. 6,570,109 granted May 27, 2003 to Paul A. Klinefelter et al. entitled "Quick Shut-Off Extended Range Hygroscopic Rain Sensor for Irrigation Systems", and U.S. Pat. No. 6,977,351 granted Dec. 20, 2005 to Peter J. Woytowitz entitled "Moisture Absorptive Rain Sensor with Sealed Position Sensing Element for Irrigation Watering Program Interrupt", the entire disclosures of both of which are incorporated herein by reference. Both of the aforementioned U.S. patents are also assigned to Hunter Industries, Inc.

The rain and freeze sensor 20 (FIG. 1) includes an outer injection molded plastic housing 26 that encloses a pair of moisture absorbing members in the form of a taller stack 28 of hygroscopic discs and a shorter stack 30 of hygroscopic discs. The discs in the taller stack 28 have a slightly larger diameter than the discs in the smaller stack 30. These discs are typically made of untreated wood fibers pressed together into a material that resembles cardboard in appearance.

The term "hygroscopic" as used herein is intended to be broadly construed to cover any water-swellable material that can absorb rain drops and physically expand a sufficient amount for reasonably accurate detection by a suitable electronic sensor. One suitable commercially available hygroscopic material is Kraft Press Board which is made from cellulose pulp. Suitable water-swellable polymers and other hygroscopic materials are disclosed in U.S. Pat. No. 4,655,076 granted Apr. 7, 1987 to Weihe et al., the entire disclosure of which is hereby incorporated by reference.

The stacks 28 and 30 of hygroscopic discs are supported over a common swing arm 32 for vertical reciprocal motion relative to a vertical shaft 34 that extends through an aperture 32a in the swing arm 32. A coil spring 36 surrounds the shaft 34 and normally pushes the stack 28 upwardly against a stop 38. A torsion spring (not illustrated) associated with the pivot axis (not illustrated) of the swing arm 32 lifts the swing arm 32 and the stack 30 upward to another fixed stop (not illustrated).

When rain water enters the housing 26 via aperture 40 and funnel 42 the hygroscopic discs of the stacks 28 and 30 absorb water and swell, pushing the swing arm 32 downwardly. A permanent magnet 44 is mounted on one end of the swing arm 32. A stationary linear Hall effect sensor 46 has its electrical contacts soldered to conductive traces on a vertically mounted printed circuit board 48. The Hall effect sensor is mounted adjacent the permanent magnet 44 and generates a signal representative of the position of the magnet 44 that is proportional to the amount of expansion of the stacks 28 and 30 caused by rain water entering the rain and freeze sensor 20. The Hall effect sensor 46 may be part number A1395SEHLT-T commercially available from Alegro. The small stack 30 absorbs water quickly via funnel 42 so that a rain event will be quickly detected. The large stack 28 dries out slowly so that the rain interrupt signal from the rain and freeze sensor 20 will not be terminated too quickly as the hydroscopic discs dry out.

A shaft 56 extends through the centers of the discs of the shorter stack 30. The upper end of the shaft 56 can be depressed with a finger tip to run a test of the device. A vertical wall or baffle 58 inside the housing 26 provides a water-tight seal between the portion of the rain and freeze sensor 20 containing the stacks 28 and 30 and the portion of the rain and freeze sensor 20 containing the printed circuit board 48. The portion of the housing 26 containing the printed circuit board 48 can be potted with a water resistant material (not illustrated) to further protect the circuitry of the rain and freeze sensor 20.

Figure 2:
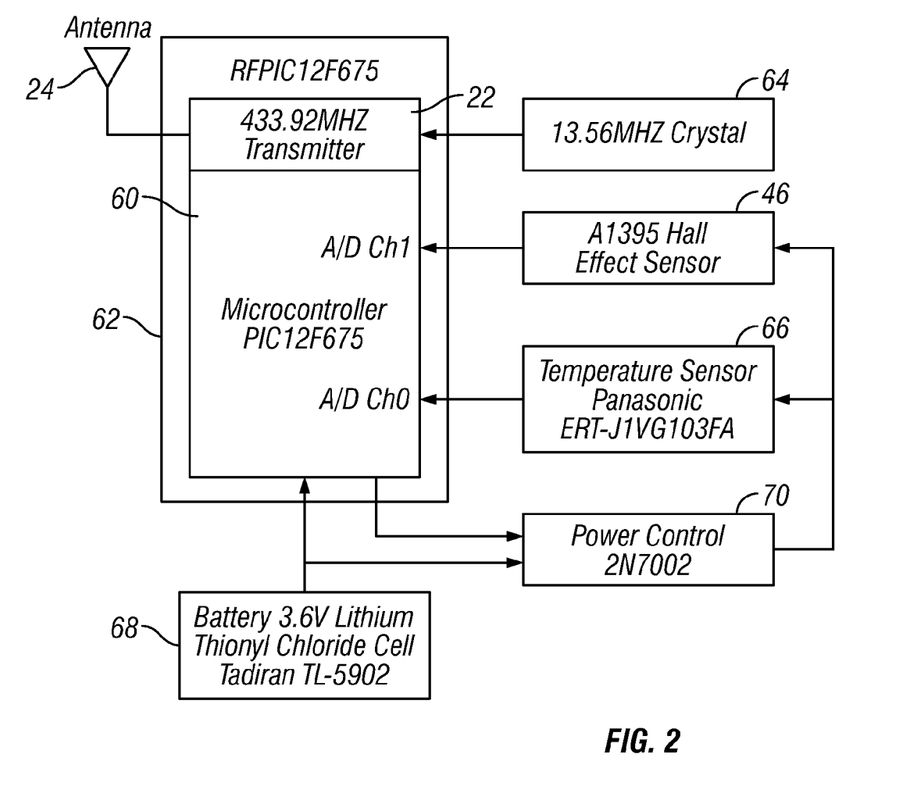
FIG. 2 is a block diagram of the circuitry of the rain and freeze sensor of FIG. 1.

FIG. 2 is a block diagram of the circuitry of the rain and freeze sensor 20 of FIG. 1. The circuitry illustrated in FIG. 2 is mounted on the printed circuit board 48. The circuitry includes a combination UHF transmitter 22 and a microcontroller 60 in a single integrated circuit (IC) package 62 such as the RFPIC12F675 commercially available from Microchip Technology. The microcontroller 60 includes a processor and a built-in memory that can be programmed with an algorithm that is executed by the processor to determine whether rainfall has occurred. The UHF transmitter 22 uses a 13.56 MHZ crystal 64, and a x32 phase locked loop (PLL) to generate a 433.92 MHZ ON-OFF key transmission. Analog-to-digital (A/D) converter ports on the microcontroller 60 interface to an ambient temperature sensor 66, such as a negative temperature coefficient (NTC) thermistor, part number ERT-J1VG103FA commercially available from Panasonic. Another A/D port on the microcontroller 60 interfaces to the Hall effect sensor 46 to determine the position of the permanent magnet 44. The circuitry on the printed circuit board 48 is powered by a battery cell 68, such as a 3.6V Lithium Thionyl Chloride battery cell part number TL-5902 commercially available from Tadiran. A power control device 70 such as a MOSFET, industry standard 2N7002, switches power to the Hall effect sensor 46, and the temperature sensor 66 in response to a control signal from the microcontroller 60, to conserve power by powering down these devices when no readings are being taken.

Figure 3:
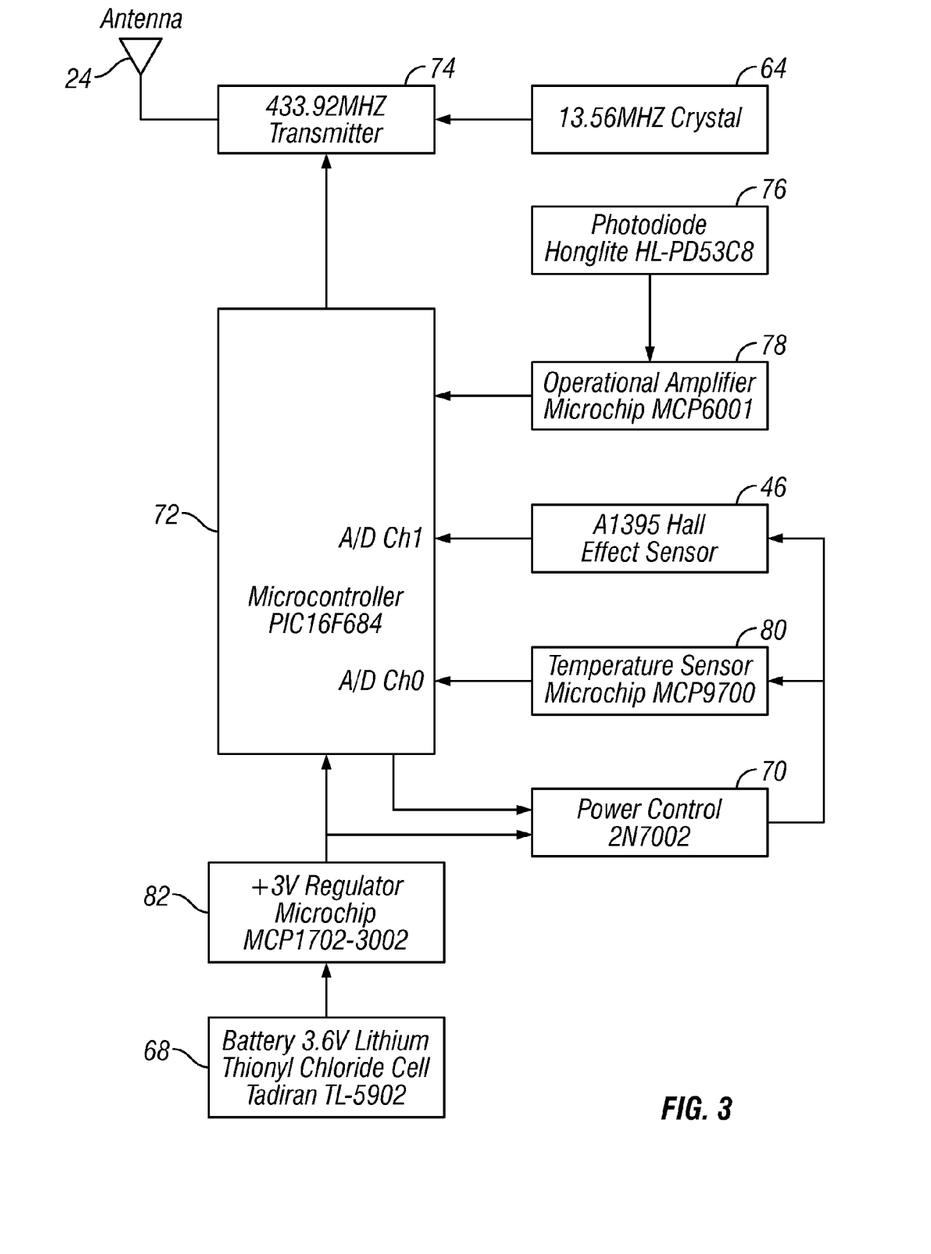
FIG. 3 is a block diagram of the circuitry of an alternate embodiment of the present invention.

Referring to FIG. 3, the circuitry of an alternate embodiment of the rain and freeze sensor 20 is similar to the circuitry illustrated in FIG. 2 except that due to input-output (I/O) limitations on the RFPIC12F675 IC, a separate microcontroller 72 and transmitter 74 are used. The separate microcontroller 72 may be a part number PIC16F684 commercially available from Microchip Technology. The microcontroller 72 provides more I/O capability than the micro-controller 60. The microcontroller 72 has additional I/O pins which provide an interface to a solar radiation sensor 76 through an operational amplifier 78, to a temperature sensor 80, and to the Hall effect sensor 46 to create a mini weather station similar to that disclosed in U.S. patent application Ser. No. 12/181,894 filed by Peter J. Woytowitz et al. referenced earlier in this section. The solar radiation sensor 76 may be the Honglite HL-PD53C8 photodiode. The solar radiation sensor 76 may be mounted in a cylindrical receptacle 50 (FIG. 1) inside a transparent cap or cover 52 that fits over the highest portion of the housing 26. The operational amplifier 78 (FIG. 3) may be a part number MCP6001 available from Microchip Technology. The operational amplifier 78 amplifies the current output of the solar radiation sensor 78, and converts it to a voltage which represents the amount of solar radiation incident on the sensor 78. The temperature sensor 80 is an active temperature sensor, such as part number MCP9700, available from Microchip technology. A voltage regulator 82 is coupled between the battery cell 68 and the microcontroller 72 and increases the measurement accuracy of the solar radiation sensor 76 and temperature sensor 80 due to the fact that they are non-ratio metric sensors.

The intelligent rain sensor of the present invention uses the combination of the motion of a permanent magnet caused by the swelling of hydroscopic discs, and an adjacent Hall effect sensor to detect rain. At the same time, pre-programmed algorithms provide protection from false triggering, e.g. rain shut off commands that would otherwise be generated by ambient environmental conditions other than steady measurable rainfall, e.g. dew, a light sprinkle or high humidity. In the presence of an actual rain drop, or several rain drops, the hygroscopic discs in the stacks 28 and 30 swell rapidly and cause a relatively fast motion of the arm. In the presence of dew, high humidity or a light sprinkle the swelling that occurs is much slower and results in a relatively slow motion of the swing arm 32. The relative position of the permanent magnet 44 carried on the remote end of the swing arm 32 can be determined based on the output of the Hall effect sensor 46. Dew, high humidity and/or a light sprinkle can be differentiated from measurable rainfall by determining both the distance the magnet 44 moves and the speed or rate which the magnet 44 moves. The speed of movement of the remote end of the swing arm 32 and the magnet 44 carried thereby can be ascertained by taking the derivative of its position. Details of various algorithms that can be used to differentiate actual rainfall from dew, a light sprinkle and/or high humidity are described hereafter. Where an inexpensive microcontroller is utilized there may be insufficient memory for storing a more sophisticated intelligent decision program. In addition it may be desirable to use less processing to reduce the drain on the battery cell 68.

In accordance with one version of the pre-programmed algorithm executed by the microcontroller 60 or the microcontroller 72, the microcontroller "learns" minimum and maximum electronic set points for the total range of travel of the permanent magnet 44. During normal sampling the microcontroller records a maximum threshold. The microcontroller also records a minimum threshold. Both the minimum and maximum thresholds are periodically updated.

The first time the magnet 44 of the intelligent rain sensor passes the neutral point to the high side it sends a shut off signal to the irrigation controller that commands it to stop watering. The microcontroller records the maximum high value achieved, which may occur during a dew, rain, or manual test event. The first time the intelligent rain sensor passes the neutral point to the low side, it sends a watering OK signal to the irrigation controller that commands it to allow watering. The microcontroller records the minimum low value achieved, which may occur after a dew, rain, or manual test event.

Thereafter, the microcontroller continuously monitors and changes the minimum and maximum thresholds to be their highest and lowest recorded values for the life of the intelligent rain sensor. This is preferably not a floating value that takes into consideration any changes in the dynamics of the system over time as this scenario introduces too much risk. The minimum value may increase over time if the hygroscopic discs expand too much, but that will not be a factor in the routine hereafter described. Preferably the maximum value is never less than the recorded maximum because of the stops.

After the first cycle, nominal low and high values have been recorded. The low value may go lower with subsequent sampling, such as when the hygroscopic discs dry out more, but never higher. Conversely the higher value may go higher with subsequent sampling, but never lower. The values should always be the lowest and highest recorded values for the life of the intelligent rain sensor.

After the first event that sets the temporary thresholds, the following routine goes into effect. Sample every three seconds (or whatever sampling is determined to be best). If the Hall effect sensor value decreases, record the new minimum threshold. If the Hall effect value increases by more than a predetermined percentage, e.g. ten percent, of the recorded minimum threshold amount between three consecutive scans, consider it a rain event, set the program to send a rain shut off command as soon as the magnet 44 has passed the neutral threshold. This routine will accomplish a quick rain shut off.

If the Hall effect sensor value increases, but by less than a predetermined percentage, e.g. ten percent, of the recorded minimum threshold amount between three consecutive samplings, consider it a dew event and do not send a rain shut off command when the magnet 44 passes the neutral threshold. The neutral threshold represents the transition where the output of the Hall effect sensor changes from a negative value to a positive value. When the intelligent rain sensor is dry, the Hall effect sensor registers a negative value. When it is fully absorbed with water, it registers a positive value. Normal rain shut off happens at the neutral transition point. If it is determined that the absorptive material is swelling at a relatively slow rate, the intelligent rain sensor does not send the command to the irrigation controller to suspend watering, but continues to sample and monitor the output signal of the Hall effect sensor. If at any point the sensor is at seventy-five percent of the maximum recorded value, (three quarters of the distance from the normal message point to the maximum travel of the material) the intelligent rain sensor will override the dew program and assume a rain event has occurred then send a shut off command to the controller. In this case the intelligent rain sensor resets the irrigation controller to normal operation as the magnet 44 passes the neutral point. Preferably the intelligent rain sensor will send a shut off command to the irrigation controller at seventy-five percent of the maximum recorded threshold.

The scenario described above will allow the swing arm to travel further before dew shuts it off to prevent at least a percentage of the dew shut offs. No matter what, the over ride at seventy-five percent of the maximum recorded value will trigger a rain shut down, so this override will always insure that the irrigation system shuts off during rain. The rain event scenario will shut the system off sooner; but the override will insure that the system always shuts off if it has moved close to its entire length of travel, no matter what.

The algorithms illustrated in FIGS. 4-7 employ a similar approach in that they detect the speed of the motion of the swing arm 32, and if the speed is fast, one threshold for the determination of a rain event is used, whereas if the speed of the swing arm 32 is slow, a different threshold for the determination of a rain event is used. Where the algorithms differ is in their approach to determining the speed of the motion of the swing arm 32.

Figure 4:
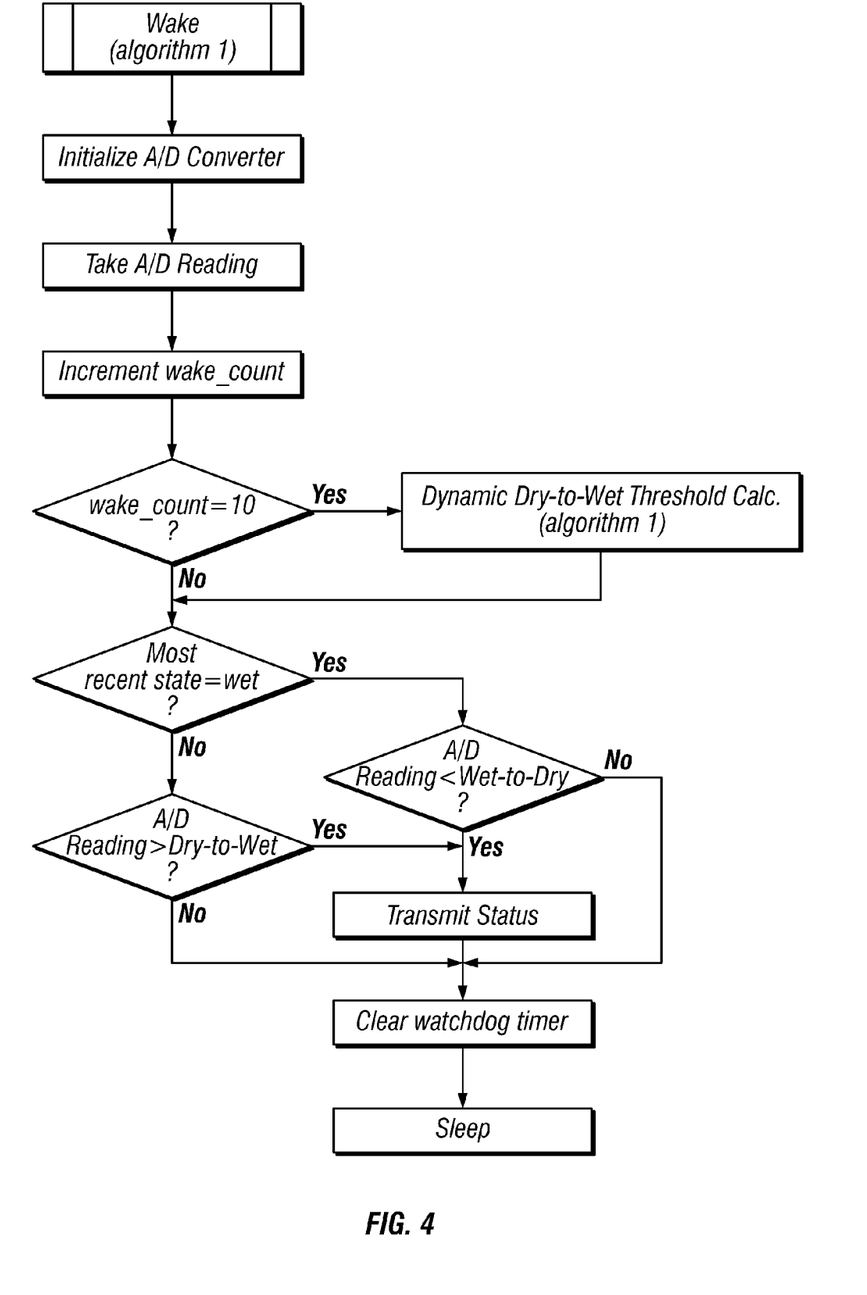
FIGS. 4 and 5 are flow diagrams illustrating a first algorithm for execution by the intelligent rain sensor of the present invention.
Figure 5:
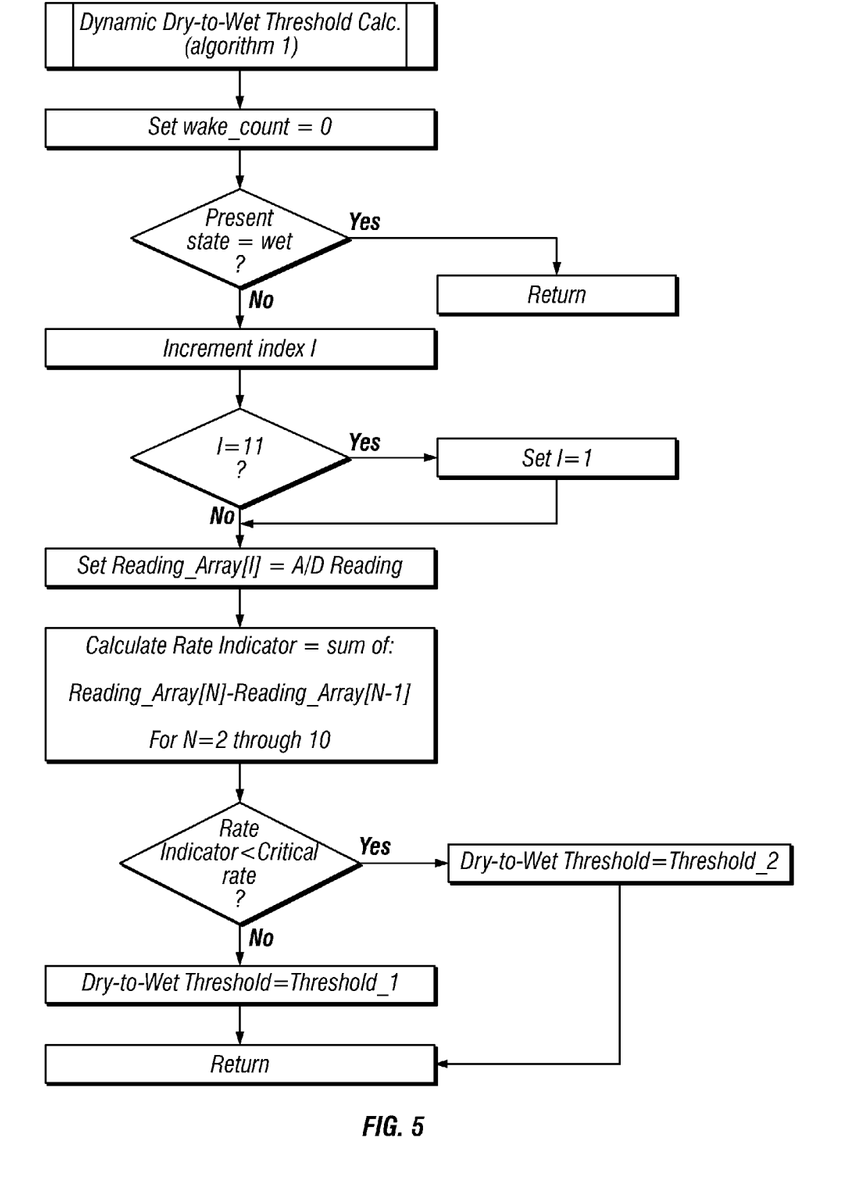

The first algorithm illustrated in FIGS. 4 and 5 differentiates rain from dew and is well suited for use in an intelligent rain sensor having moderate amounts of memory and computational power. The intelligent rain sensor spends most of the time in a "sleep" mode. It "wakes up" every two to three seconds, and executes the sequence of steps illustrated in FIG. 4. Each time the intelligent rain sensor wakes up, the present position of the swing arm 32 is compared to two thresholds. The first threshold is the dry-to-wet threshold which is the threshold for a dry sensor to detect a rain event. The second, threshold is the wet-to-dry threshold, which is the threshold for a wet sensor to detect a return to the dry state. Upon a change in state, the intelligent rain sensor will transmit its status to the irrigation controller. Also, each time the intelligent rain sensor wakes up it increments a counter, "wake_count" by one. Every time the "wake_count" reaches a count of ten (every twenty to thirty seconds) the sequence of steps illustrated in FIG. 5 will perform a dynamic dry-to-wet threshold calculation. This resets the "wake_count" counter back to zero, and determines an appropriate threshold for the detection of a rain event.

Referring still to FIG. 5, every twenty to thirty seconds the present state of the intelligent rain sensor is used to determine whether or not to proceed with the dynamic dry-to-wet threshold calculation, or simply return to the main program. If the state is already determined to be "wet" then the program will re-set since the dry-to-wet decision has already occurred. If, on the other hand, the present state of the sensor is "dry", then the calculation is carried out to determine the appropriate dry-to-wet threshold setting. This calculation involves looking at an array, which stores the previous ten position readings for the swing arm 32, and calculating a rate indicator which is the sum of the differences between each two adjacent readings in the array. This number is indicative of the speed at which the swing arm 32 has been moving for the last two hundred to three hundred seconds. If the rate indicator is above a predetermined critical rate then the movement of the swing arm 32 is assumed to be fast and most likely due to an actual rain event. If this is the case, no adjustment is made to the dry-to-wet threshold, and the value Threshold_1 is used which is the nominal dry-to-wet threshold. If, on the other hand, the rate indicator is less than the pre-determined critical rate, then the movement of the swing arm 32 is assumed to be slow, and most likely due to high humidity or dew. If this is the case a new dry-to-wet threshold (Threshold_2) is used to determine the state of the intelligent rain sensor. Threshold_2 is chosen such that the displacement of the swing arm 32 needs to be about twenty percent greater, than with the previous scenario. This increase in required swing arm displacement does two things. First, for dew events, it allows ample time for the event to subside, and the sun to come out prior to tripping the sensor. Second, in high-humidity conditions, it moves the threshold to a point where most humidity based movement will never trigger the sensor.

Figure 6:
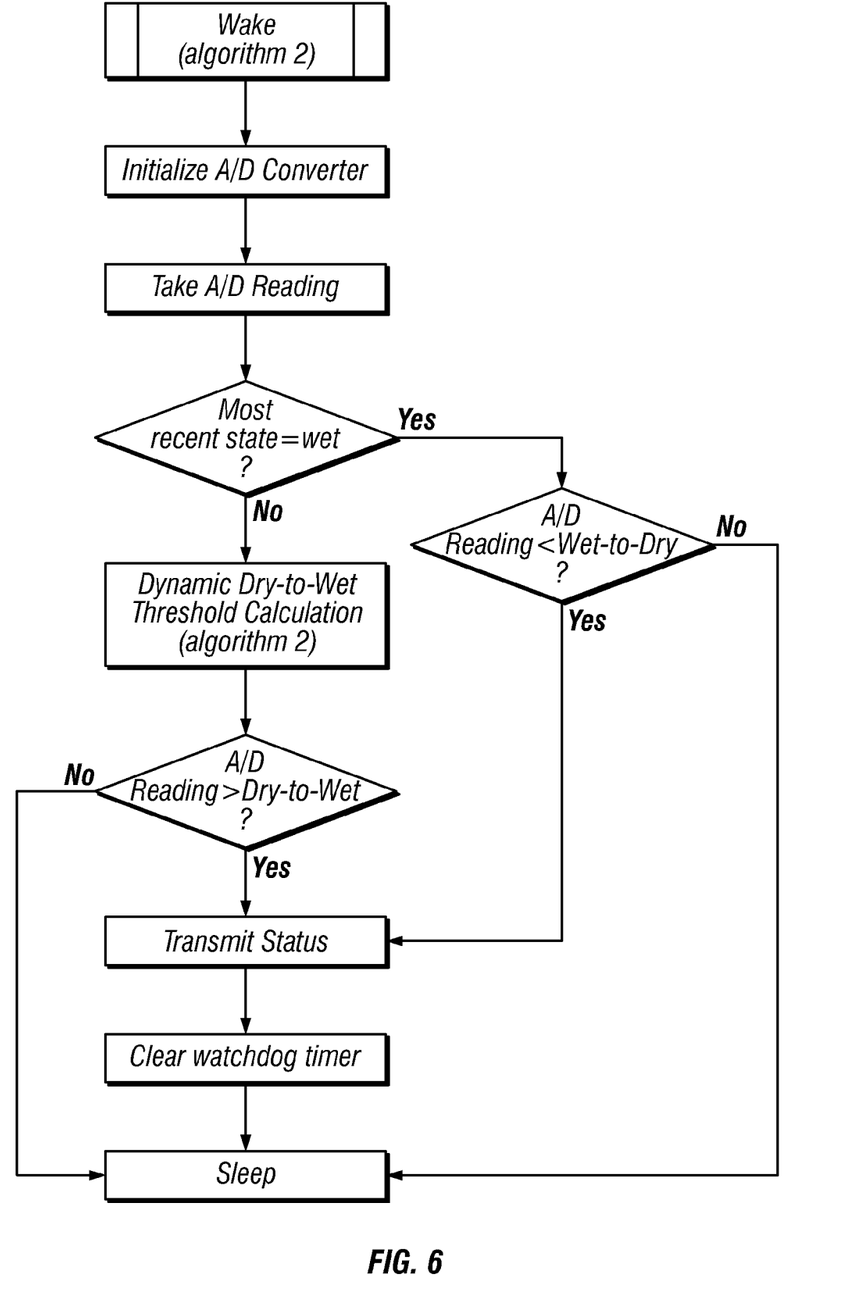
FIGS. 6 and 7 are flow diagrams illustrating a second algorithm for execution by the intelligent rain sensor of the present invention.
Figure 7:
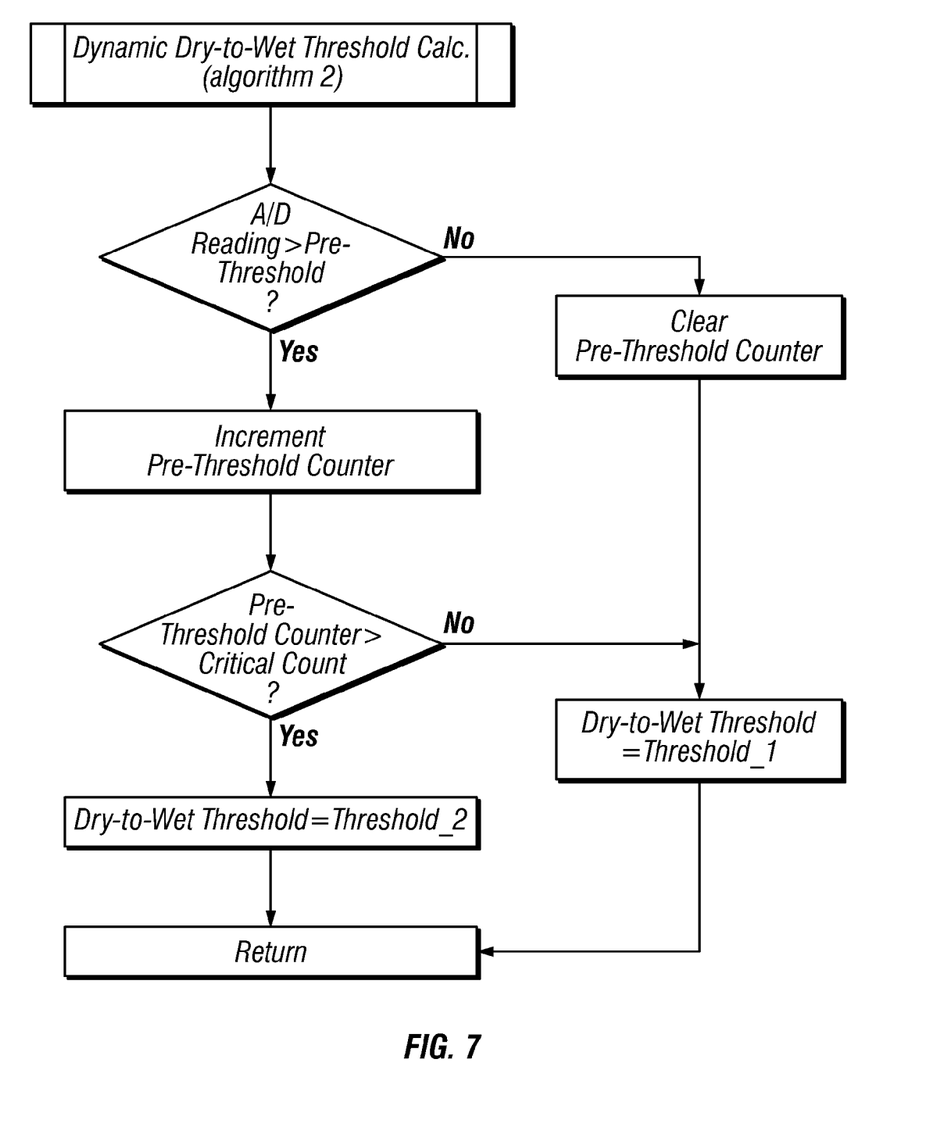

The second algorithm illustrated in FIGS. 6 and 7 uses a slightly different approach to determine the rate of motion of the swing arm 32, and is better suited for microcontrollers with limited memory and computational power. The second algorithm is similar to the first algorithm illustrated in FIGS. 4 and 5 with the exception of the way the dynamic dry-to-wet threshold is determined. Referring to FIG. 7, the second algorithm sets up a pre-threshold region within the range of motion of the swing arm 32 that is an area just prior to the dry-to-wet threshold. The microcontroller then determines the amount of time that the swing arm 32 spends in the pre-threshold area by measuring the number of successive samples that fall in this area, and comparing that number to a predetermined critical count. If the number is less than the critical count, then the time spent in this area is short, the movement of the swing arm 32 is relatively fast, and assumed to be caused by an actual rain event. In this case the dry-to-wet threshold is set to the nominal value of Threshold_1. If, on the other hand, the number of successive samples in the pre-threshold area is greater than the critical count, then the swing arm 32 spent a larger amount of time in the pre-threshold area, meaning the motion of the swing arm 32 is relatively slow and assumed to be due to dew or high humidity. If this is the case, the dry-to-wet threshold is set to Threshold 2, which as in the case of algorithm 1, requires the arm to move further prior to triggering the sensor.

The intelligent rains sensor of the present invention measures the speed of the expansion of the hygroscopic material, and the threshold level of a dry-to-wet determination is modified based on the speed of the expansion. The threshold either takes on its nominal value, or a second value which is greater than the nominal value. However, it is also possible to use an algorithm where the threshold is determined mathematically from the speed of the swing arm motion, and position of the swing arm, resulting in many more than two possible thresholds. It is also possible to use algorithms where the position of the swing arm is measured over long periods of time so that the intelligent sensor "learns" the two extremes of the motion of the swing arm and adjusts the nominal threshold based on this information.

While several embodiments of the present invention have been described further modifications and adaptations thereof will occur to those skilled in the art. For example, where the rain and freeze sensor 20 is connected to a standard household electrical outlet an electro-magnet could be used in place of the permanent magnet. While the intelligent rain sensor has been described as an integral part of the rain and freeze sensor 20, it may be used as a stand alone rain sensor in either hardwired or wireless form. Other configurations of hygroscopic members besides discs may be used and there need not be multiple hygroscopic members. The magnet need not be carried on a swing arm with the hydroscopic discs supported above it. The magnet need only be operatively coupled to move in a manner proportional to both an amount of expansion of a hygroscopic upon absorbing moisture. The magnet could be mounted directly on the hygroscopic member or mounted on some other mechanical support connected by a gear train or other mechanical linkage to move with the expansion of the hygroscopic member. The Hall effect sensor 46 could be mounted on the swing arm 32 and the magnet 44 could be stationary. Other forms of magnetic sensors could be used such as magneto-resistive, fluxgate and magneto-inductive sensors. In addition, other forms of electronic sensors could be used besides magnetic sensors, including an optical position sensor such as infrared (IR) detector. In such a case an IR emitting diode can transmit IR radiation onto reflective gradations on the swing arm 32, and an IR detector can be used to sense reflected IR radiation to determine the amount of movement of the swing arm 32. Modifications of the algorithms described above could be used in a rain sensor with a sponge that absorbs moisture and is weighed over time via strain gauges to determine both the amount of moisture absorbed and the rate of absorption. Therefore the protection afforded our invention should only be limited in accordance with the following claims.

We claim:

1. A rain sensor comprising:
   at least one hygroscopic member;
   an electronic sensor that detects an amount of expansion of the hygroscopic member upon absorbing moisture;
   a computer processor; and
   a memory connected to the computer processor and preprogrammed with an algorithm that enables the computer processor to determine the presence of rainfall and generate a shut off command, the determination being based on the signals generated by the electronic sensor indicating that the at least one hygroscopic member has expanded a predetermined amount and has expanded at a predetermined rate;
   wherein the algorithm causes the computer processor to periodically calculate a dry-to-wet threshold and a wet-to-dry threshold, to periodically determine minimum and maximum set points for a range of travel of a magnet operatively coupled to the at least one hygroscopic member, and to generate the shut off command when the magnet has moved a predetermined percentage away from the minimum set point.

2. The rain sensor of claim 1 wherein the electronic sensor is selected from the group consisting of a magnetic sensor and an optical sensor.

3. The rain sensor of claim 1 wherein the electronic sensor comprises a magnetic sensor and the magnet moves in an amount proportional to both the amount and the rate of expansion of the at least one hygroscopic member.

4. The rain sensor of claim 3 wherein the magnet is operatively coupled to the at least one hygroscopic member by mounting the magnet on an arm that moves with the expansion of the at least one hygroscopic member.

5. The rain sensor of claim 4 wherein the magnetic sensor is selected from the group consisting of a Hall effect sensor, a magneto-resistive sensor, a fluxgate sensor, and a magneto-inductive sensor.

6. The rain sensor of claim 1 wherein the computer processor and the memory are part of a microcontroller.

7. The rain sensor of claim 1 wherein the at least one hygroscopic member comprises a plurality of hygroscopic discs.

8. A rain sensor comprising:
   at least one hygroscopic member;
   an electronic sensor that detects an amount of expansion of the at least one hygroscopic member upon absorbing moisture;
   a computer processor; and
   a memory connected to the computer processor and preprogrammed with an algorithm that enables the computer processor to determine the presence of rainfall and to generate a shut off command, the determination being based on the signals generated by the electronic sensor indicating that the at least one hygroscopic member has expanded a predetermined amount and has expanded at a predetermined rate;
   wherein the algorithm causes the computer processor to set up a pre-threshold region within a range of motion of a magnet of the electronic sensor that is an area just prior to a dry-to-wet threshold and to determine an amount of time that the magnet spends in the pre-threshold region by measuring a predetermined number of successive samples that fall in the area and comparing that number to a predetermined count.

9. A rain sensor, comprising:
   at least one hygroscopic member;
   a magnet operatively coupled to move in a manner proportional to both an amount and a rate of expansion of the at least one hygroscopic member upon absorbing moisture, wherein the magnet is operatively coupled to the at least one hygroscopic member by mounting the magnet on an arm that moves with the expansion of the at least one hygroscopic member;
   a magnetic sensor positioned adjacent the magnet that generates signals representative of a position of the magnet;
   a computer processor; and
   a memory connected to the computer processor and preprogrammed with an algorithm that enables the computer processor to determine the presence of rainfall and to generate a shut off command, the determination being based on the signals generated by the magnetic sensor indicating that the magnet has moved a predetermined amount and has moved at a predetermined rate;
   wherein the algorithm causes the computer processor to periodically determine minimum and maximum set points for a range of travel of the magnet and to generate the shut off command when the magnet has moved a predetermined percentage away from the minimum set point.

10. The rain sensor of claim 9 wherein the magnetic sensor is selected from the group consisting of a Hall effect sensor, a magneto-resistive sensor, a fluxgate sensor, and a magneto-inductive sensor.

11. The rain sensor of claim 9 wherein the algorithm further causes the computer processor to periodically calculate a dry-to-wet threshold and a wet-to-dry threshold based on periodically sampling the position of the magnet.

12. The rain sensor of claim 9 wherein the magnet is a permanent magnet.

13. The rain sensor of claim 9 wherein the at least one hygroscopic member comprises a plurality of hygroscopic discs.

14. The rain sensor of claim 9 wherein the arm is moved by a larger stack of hygroscopic discs or a smaller stack of hygroscopic discs.

15. A rain sensor comprising:
at least one hygroscopic member;
a magnet operatively coupled to move in a manner proportional to both an amount and a rate of expansion of the at least one hygroscopic member upon absorbing moisture;
a magnetic sensor positioned adjacent the magnet that generates signals representative of a position of the magnet;
a computer processor; and
a memory connected to the computer processor and pre-programmed with an algorithm that enables the computer processor to determine the presence of rainfall and to generate a shut off command, the determination being based on the signals generated by the magnetic sensor indicating that the magnet has moved a predetermined amount and has moved at a predetermined rate;
wherein a pre-threshold region is defined within a range of motion of the magnet that is an area just prior to a dry-to-wet threshold and the computer processor then determines an amount of time that the magnet spends in the pre-threshold region by measuring a predetermined number of successive samples that fall in the area, and comparing that number to a predetermined count.

16. A rain sensor, comprising:
a housing;
a first stack of hygroscopic discs inside the housing having a first height;
a second stack of hygroscopic discs inside the housing having a second height shorter than the first stack;
a swing arm pivotally mounted inside the housing for movement by either the first and second stacks as they expand due to absorption of water through at least one aperture in the housing and contract due to loss of water through evaporation;
a magnet mounted on the swing arm;
a Hall effect sensor positioned inside the housing adjacent the magnet that generates signals representative of a position of the magnet;
a computer processor; and
a memory connected to the computer processor and comprising an algorithm that, when executed, causes the computer processor to periodically determine minimum and maximum set points for a range of travel of the magnet and to generate a shut off command when the magnet has moved a predetermined percentage away from the minimum set point.

17. A rain sensor, comprising:
at least one hygroscopic member;
an electronic sensor comprising a magnet and operatively associated with the at least one hygroscopic member, the electronic sensor configured to generate an output signal representative of an amount of expansion of the at least one hygroscopic member due to the absorption and evaporation of water as indicated by movement of the magnet;
a computer processor; and
a memory connected to the computer processor and comprising an algorithm that, when executed, causes the computer processor to set up a pre-threshold region within a range of motion of the magnet comprising an area just prior to a dry-to-wet threshold, to determine an amount of time that the magnet spends in the pre-threshold region by measuring a predetermined number of successive samples that fall in the area and comparing that number to a predetermined count, and to generate a shut off command based at least in part on the amount of time the magnet spends in the pre-threshold region.

18. A rain sensor, comprising:
at least one hygroscopic member;
an electronic sensor comprising a magnet and operatively associated with the at least one hygroscopic member that generates an output signal representative of an amount of expansion of the at least one hygroscopic member due to the absorption and evaporation of water as indicated by movement of the magnet;
a computer processor; and
a memory connected to the computer processor and comprising an algorithm that, when executed, causes the computer processor to periodically determine minimum and maximum set points for a range of travel of the magnet and to generate a shut off command when the magnet has moved a predetermined percentage away from the minimum set point.

19. A rain sensor, comprising:
at least one hygroscopic member;
an electronic sensor comprising a magnet and operatively associated with the at least one hygroscopic member, the electronic sensor configured to generate an output signal representative of an amount of expansion of the at least one hygroscopic member due to the absorption and evaporation of water as indicated by movement of the magnet;
a computer processor; and
a memory connected to the computer processor and comprising an algorithm that, when executed, causes the computer processor to periodically determine minimum and maximum set points for a range of travel of the magnet and to intermittently sample the amount of expansion of the at least one hygroscopic member, a shut off command being generated when a first predetermined threshold amount of expansion has been detected and a predetermined rate of expansion has been detected, the shut off command also being generated when the magnet has moved a predetermined percentage away from the minimum set point such that a second predetermined threshold of expansion has been detected that is larger than the first predetermined threshold of expansion regardless of the rate of expansion.

20. A rain sensor, comprising:
at least one hygroscopic member;
an electronic sensor including a magnet operatively associated with the at least one hygroscopic member that generates an output signal representative of an amount of expansion of the at least one hygroscopic member due to the absorption and evaporation of water;
a computer processor; and a memory connected to the computer processor and pre-programmed with an algorithm for generating a shut off command based upon the output signal by detecting a predetermined amount of expansion and by measuring a rate of expansion of the at least one hygroscopic member and adjusting when the shut off command is generated based upon the measured rate of change and a pre-threshold region defined within a range of motion of the magnet that is an area just prior to a dry-to-wet threshold, the computer processor determining an amount of time that the magnet spends in the pre-threshold region by measuring a predetermined number of successive samples that fall in the area, and comparing that number to a predetermined count.

* * * * *